(12) United States Patent
Ziltener et al.

(10) Patent No.: US 11,655,843 B2
(45) Date of Patent: May 23, 2023

(54) EXPANSION ANCHOR AND METHOD FOR DISASSEMBLING AN EXPANSION ANCHOR

(71) Applicant: Hilti Aktiengesellschaft, Schaan (LI)

(72) Inventors: Michael Ziltener, Siebnen (CH); Arjen Detmer Dijkhuis, Shanghai (CN); Karl Haeussler, Lunden (CH)

(73) Assignee: Hilti Aktiengesellschaft, Schaan (LI)

( * ) Notice: Subject to any disclaimer, the term of this patent is extended or adjusted under 35 U.S.C. 154(b) by 734 days.

(21) Appl. No.: 16/491,562

(22) PCT Filed: Feb. 27, 2018

(86) PCT No.: PCT/EP2018/054738
§ 371 (c)(1),
(2) Date: Sep. 5, 2019

(87) PCT Pub. No.: WO2018/162275
PCT Pub. Date: Sep. 13, 2018

(65) Prior Publication Data
US 2021/0131474 A1    May 6, 2021

(30) Foreign Application Priority Data
Mar. 7, 2017 (EP) .................................... 17159523

(51) Int. Cl.
*F16B 31/02* (2006.01)
*F16B 13/04* (2006.01)

(52) U.S. Cl.
CPC .......... *F16B 31/021* (2013.01); *F16B 13/045* (2013.01)

(58) Field of Classification Search
CPC .. F16B 13/0875; F16B 35/048; F16B 13/066; F16B 19/008; F16B 13/065; F16B 41/005; F16B 13/045; F16B 31/021
See application file for complete search history.

(56) References Cited

U.S. PATENT DOCUMENTS 3,512,448 A * 5/1970 Jeal ........................ F16B 13/065
411/53
3,577,825 A * 5/1971 Reusser ................ F16B 13/066
411/53

(Continued)

FOREIGN PATENT DOCUMENTS

DE    102005022655 A1 * 11/2006 ............ F16B 13/065
DE    102010017722 A1    3/2011

(Continued)

OTHER PUBLICATIONS

Brueckl Ges Fuer Befestigungss, DE-102005022655-A1, Machine Translation (Year: 2005).*

(Continued)

*Primary Examiner* — Lee A Holly
(74) *Attorney, Agent, or Firm* — Davidson, Davidson & Kappel, LLC

(57) ABSTRACT

A disassembly method for an anchor that is anchored in a hole and that has an anchor bolt is provided, whereby, during the disassembly procedure, a torque is applied to the bolt of the anchor that is anchored in the hole and, in this process, the anchor bolt is stressed until it breaks. An anchor which has a head and whose bolt has an engaging profile so that a torque can be applied to the anchor bolt is also provided.

23 Claims, 8 Drawing Sheets

(56) References Cited

U.S. PATENT DOCUMENTS

| | | | | |
|---|---|---|---|---|
| 4,613,264 | A * | 9/1986 | McIntyre | F16B 13/045 411/65 |
| 4,764,055 | A * | 8/1988 | Clark | E21D 20/025 411/60.2 |
| 5,203,647 | A * | 4/1993 | Blackwell | F16B 13/0875 411/33 |
| 5,228,250 | A * | 7/1993 | Kesselman | F16B 41/005 411/910 |
| 6,626,627 | B2 * | 9/2003 | Oesterle | F16B 23/0092 411/910 |
| 8,192,122 | B2 * | 6/2012 | Gaudron | F16B 13/066 411/63 |
| 10,422,367 | B2 * | 9/2019 | Graham | F16B 19/008 |
| 2001/0028835 | A1 | 10/2001 | Oesterle et al. | |
| 2013/0097845 | A1 | 4/2013 | Schaeffer et al. | |
| 2016/0053792 | A1 * | 2/2016 | Rosenkranz | F16B 13/066 29/428 |
| 2016/0238051 | A1 | 8/2016 | Schaeffer et al. | |

FOREIGN PATENT DOCUMENTS

| | | |
|---|---|---|
| DE | 102013112959 A1 | 5/2015 |
| GB | 1564237 A | 4/1980 |
| WO | WO2011009068 A1 | 1/2011 |

OTHER PUBLICATIONS

International Search Report of PCT/EP2018/054738, dated Apr. 26, 2018.

* cited by examiner

EXPANSION ANCHOR AND METHOD FOR DISASSEMBLING AN EXPANSION ANCHOR

The invention relates to a disassembly method for an anchor that is anchored in a hole and to an anchor.

BACKGROUND

U.S. patent application Ser. No. 2016/0238051 A1 discloses anchor arrangements in which an add-on part is held on a substrate by means of a nut that is screwed to an expansion anchor. When such an arrangement is installed, first of all, the anchor is inserted into the substrate. When the nut is subsequently tightened on the expansion anchor, the latter is pretensioned, thereby activating the expansion mechanism of the anchor and simultaneously securing the add-on part to the substrate. If the add-on part is to be disassembled again from such expansion anchors, then the anchor nut could be unscrewed again and the add-on part could be taken off.

Moreover, German patent application DE 10 2013 112959 A1, for instance, discloses expansion anchors having a head that is permanently joined to the anchor bolt of the expansion anchor. If the add-on part is to be disassembled once again, which might be necessary, for example, if a fire-protection panel that is fastened by means of the anchor has to be disassembled for maintenance purposes, this cannot be done by simply loosening a screw connection. For this reason, German patent application DE 10 2013 112959 A1 proposes using a pair of pliers of some kind in order to cut the head of the expansion anchor off the anchor bolt.

German patent application DE 10 2010 017722 A1 discloses expansion anchors in which the anchor bolt has a head permanently arranged on the anchor bolt as well as an outer thread. The outer thread is intended to make it possible to reuse the expansion anchor by screwing on a nut after the head has been cut off in order to disassemble the add-on part. According to German patent application DE 10 2010 017722 A1, the head should be cut off using an anchor bolt cutter or an angle grinder. According to German patent application DE 10 2010 017722 A1, the anchor bolt cutter or the angle grinder has to be placed on the anchor in a position that is specially provided for this purpose and that is arranged in such a way that the outer thread becomes accessible once the head has been cut off.

U.S. Pat. No. 3,512,448 A describes an expansion anchor that is installed using a tool that pulls on the anchor bolt. The anchor bolt has a weakened area which is situated outside of the drilled hole and along which the anchor bolt tears once the installation process has been completed. The add-on part is held by an autonomous part that is deformed during the installation process and is pressed into annular grooves on the anchor bolt.

U.S. patent application Ser. No. 2013/0097845 A discloses an anchor with headless anchor bolts, whereby the anchoring mechanism of the anchor is activated through the application of a torque. In order to indicate that a target state of the anchoring mechanism has been reached, the anchor has a predetermined breaking point that ruptures when a target torque is reached during the installation of the anchor. U.S. patent application Ser. No. 2013/097845 A does not describe a disassembly method.

SUMMARY OF THE INVENTION

It is an object of the present invention to provide a disassembly method for an anchored anchor as well as an anchor, allowing a particularly simple, reliable and secure anchor disassembly that is gentle on the surroundings of the anchor and that is very versatile to use.

The present invention provides a disassembly method for an anchor that is anchored in a hole and that has a bolt, it is provided for a torque to be applied to the bolt of the anchor that is anchored in the hole and, in this process, the anchor bolt is stressed until it breaks.

A fundamental idea of the invention which forms the basis of the method according to the invention and of the anchor according to the invention can be seen in the fact that, in order to disassemble the anchor and, if applicable, in order to disassemble an add-on part that is anchored by means of the anchor, a high torque is systematically applied to the anchor bolt in such a way that the anchor breaks at the bolt. In this context, the anchor bolt can especially be divided into a front anchor bolt fragment and a separate rear anchor bolt fragment, thereby releasing the anchoring of the add-on part that had been held by the rear end section of the anchor bolt. The rear anchor bolt fragment can be subsequently removed, whereas the front anchor bolt fragment can remain in the hole. In particular, the anchor bolt is then systematically twisted off, that is to say, a torsional break is deliberately caused. It has been found that, as a result, the anchor can be very easily and reliably disassembled, whereby, at the same time, the stress on the substrate and/or on the add-on part during the disassembly procedure can be kept very low, and this, in turn, can be advantageous for a renewed anchoring later on, for instance, if the add-on part has to be temporarily removed for inspection purposes or in order to be replaced by another add-on part. This can be ascribed to the fact that, on the one hand, according to the invention, sharp cutting tools do not have to be used to work on the anchor bolt and, on the other hand, the direction of the stress exerted during disassembly differs from the normal direction of the stress exerted on the anchor, so that, for instance, breakage of the substrate can be very easily avoided.

Prior to the disassembly, the anchor, especially at its front, is anchored in the hole in the substrate, whereas the rear of the anchor preferably protrudes from the hole in the substrate and preferably holds the add-on part in place. The anchoring of the anchor is effectuated in an anchoring area. The torque is advantageously applied to the anchor bolt in a rear section of the anchor that is situated behind the anchoring area of the anchor as seen in the longitudinal direction of the anchor. The hole is drilled in a substrate, preferably in a concrete substrate. In particular, the hole can be a blind hole since the disassembly method does not require access to the front of the anchor. Preferably, the hole is a drilled hole and/or it is configured with an at least approximately cylindrical lateral surface. If an add-on part is provided, the disassembly method can also serve to disassemble the add-on part through which the anchor passes and/or that is held by the anchor, especially on the substrate. The method also allows anchors to be disassembled that do not hold an add-on part and that, for example, have been inadvertently anchored prematurely. The vector of the torque that is applied to the anchor bolt runs especially in the direction of the longitudinal axis of the anchor and/or of the anchor bolt, that is to say, the torque causes the anchor bolt to be twisted around its longitudinal axis. Whenever the terms "radial direction", "axial direction" or "circumferential direction" are employed here, they refer especially to the longitudinal axis of the anchor and/or of the anchor bolt. The anchor bolt is preferably made of a metal material, particularly steel, and can also have a coating. The terms "front" or "rear" should preferably be used uniformly.

Fundamentally speaking, the method according to the invention can be employed in order to disassemble anchors which were erroneously installed without the add-on part. Especially preferably, however, a torque is applied to the bolt of the anchor that is anchored in the hole and, in this process, the anchor bolt is stressed until it breaks, thereby releasing the anchoring that had been effectuated by the anchor. In particular, it can be provided according to the invention for a torque to be applied to the bolt of the anchor that is anchored in the hole and for the anchor bolt to be stressed until it breaks, thus releasing the anchoring of an add-on part on a substrate that had been effectuated by the anchor. In other words, an anchor is broken that had previously anchored an add-on part to a substrate and the break releases the anchoring of the add-on part that had been effectuated by the anchor. This relatively complex disassembly procedure can be realized very easily according to the invention. The add-on part can be subsequently removed from the substrate, optionally after disassembling any additional anchors that might have been present, whereby this removal can also be considered as part of the disassembly method according to the invention.

It is particularly advantageous for the torque to be applied to the bolt of the anchor that is anchored in the hole and for the anchor bolt to be stressed until it breaks inside the add-on part or inside the substrate, preferably inside the substrate. This can further simplify the disassembly procedure.

In particular, it can be provided for the torque to be applied to the bolt of the anchor that is anchored in the hole and for the anchor bolt to be stressed until it breaks inside the hole, preferably inside the hole in the substrate. Since the breaking point is thus situated inside the hole, especially inside the substrate, the anchor can be disassembled very easily without leaving any part protruding, which, among other things, can facilitate a subsequent new installation of an add-on part at the same place since protruding anchor remnants of the anchor can be avoided. In order to very reliably effectuate a break inside the hole, a predetermined breaking point can be provided in front of the head of the anchor bolt.

Fundamentally, the method could be used for different types of anchors, for example, also for chemically fastened anchors. Especially preferably, however, the anchor is an expansion anchor. Such an expansion anchor has at least one expansion element, and on the anchor bolt, especially in a front section of the anchor bolt, an expansion section is provided for the expansion element that, when the anchor bolt is subjected to tensile force, radially displaces the expansion element, thereby anchoring the anchor. The expansion element can preferably be, for instance, an expansion sleeve that at least partially surrounds the anchor bolt. In the expansion section, which can especially be configured as an expansion cone for an expansion sleeve, the surface of the anchor bolt can taper towards the rear. Preferably, the expansion anchor is of the "force-controlled" type.

Advantageously, the anchoring area of the anchor, in other words, the area where the anchor is anchored in the drilled hole, forms a counter-bearing so that the anchor bolt can break behind the anchoring area when a torque is applied during the disassembly procedure. In the case of an expansion anchor, the anchoring area of the anchor and thus the counter-bearing are formed by the expansion element and by the expansion section.

It is especially preferred that, within the scope of the method, a torque and, at the same time, a tensile force are applied to the bolt of the anchor that is anchored in the hole and the anchor bolt is stressed until it breaks, especially inside the hole. According to this embodiment, during the disassembly procedure, the anchor bolt is stressed by torsional force and by tensile force at the same time. This can be advantageous, particularly when it comes to expansion anchors. After all, due to the additional tensile force, the expansion mechanism is anchored very firmly and it is easy to quite effectively prevent an undesired turning of the anchor bolt, so that a particularly reliable counter-bearing is created at the anchoring area and the anchor bolt breaks very reliably. The tensile force is especially directed towards the rear, in other words, in the direction facing from the anchoring area towards the head of the anchor.

In order to create a very firm counter-bearing for an expansion anchor, a non-rotating coupling can be alternatively or additionally provided between the anchor bolt and the expansion element, especially between the anchor bolt and the expansion sleeve. The non-rotating coupling can be formed, for example, by means of a non-circular cross sectional shape of the anchor bolt in the expansion section and/or by a tab that is situated on the anchor bolt and that projects radially into the expansion sleeve.

An especially advantageous embodiment consists in that the anchor bolt has a head and in that the torque is applied to the head of the anchor bolt. In particular, it can be provided for a disassembly tool to be placed on the head in order to apply the torque. Due to the very simple structure of the anchor, a torque can be applied to the head very easily and gently. The head of the anchor bolt advantageously constitutes the maximum overall cross section of the anchor bolt, that is to say, the largest cross section of the anchor bolt is at its head. In particular, the head can form a placement surface for the add-on part by means of which the add-on part can be secured directly or indirectly—for example, via a washer—with a positive fit. Preferably, the head can be arranged in a rear end section of the anchor bolt, preferably at the rear end of the anchor bolt. In particular, it can be provided for the anchor bolt to be stressed during the disassembly procedure until it breaks in front of the head, and especially for it to be stressed until it breaks between the head and the expansion section.

It is especially preferred for the expansion section and/or for the head to be permanently arranged on the anchor bolt. In particular, it is advantageous for the expansion section of the anchor bolt to be permanently joined to the head of the anchor bolt, thus allowing a very defined tension state during the disassembly procedure and yielding a very reliable disassembly. For this purpose, the anchor bolt—especially including its head and its expansion section—is advantageously configured monolithically, that is to say, without joints, which allows a permanent connection and entails very little production work. The term "permanent connection" can especially refer to a connection which cannot be released without being destroyed in the process.

Preferably, the torque and optionally also the tensile force is/are applied to the anchor bolt, especially to its head, by means of a disassembly tool. Such a disassembly tool can have, for example, claws which grip around the head, preferably in order to apply the tensile force, whereby the claws have a profile which, for purposes of transmitting the torque, engage with a mating engaging profile on the anchor bolt, especially on its head.

An anchor is fitted with a bolt which has a head in its rear section and is fitted with at least one expansion element arranged on the anchor bolt, said expansion element preferably being configured as an expansion sleeve that surrounds the anchor bolt, whereby there is an expansion section for the expansion element in the front section of the anchor bolt. In other words, the anchor is configured as an expansion anchor. It is characterized in that the anchor bolt has an engaging profile so that a torque can be applied to the anchor bolt. This engaging profile—while entailing very little production effort—can very easily apply a torque to the anchor, particularly in order to disassemble the anchor. Specifically, the anchor can be configured as already elaborated upon above in conjunction with the method, whereby the features elaborated upon there can be employed either individually or else in any desired combination. The head is preferably permanently affixed to the anchor bolt and it is especially configured monolithically together with the anchor bolt, that is to say, without joints.

The engaging profile can preferably be in the form of an external polygonal profile which is advantageously arranged on the circumference of the anchor bolt. For instance, the external polygonal profile can be in the form of external teeth. This allows a very reliable transmission of the torque while only involving very little production effort.

In a suitable manner, the engaging profile is arranged on the head, where it is very easily accessible without involving much production effort. Fundamentally, the engaging profile could also be located in front of the head.

In an advantageous manner, the engaging profile extends in the axial direction over only part of the head. As a result, one or more steps can be formed in the axial direction that can serve to introduce the tensile force during the disassembly procedure. Preferably, the head can have a collar that projects—especially radially—beyond the engaging profile and that adjoins the rear of the engaging profile. According to this embodiment, the cross section of the head on the collar arranged behind the engaging profile is larger than that on the engaging profile, at least in certain areas. On the one hand, such a collar can cover the engaging profile and thus very easily prevent, for example, damage to the engaging profile or damage caused by the engaging profile, and this is achieved in a way that is very simple in terms of production. On the other hand, a step can be formed on the collar for purposes of introducing the tensile force during the disassembly procedure.

It can be provided for the head to come into direct contact with the add-on part that is to be fastened. However, it is particularly preferred for the anchor to have a washer that surrounds the anchor bolt. This allows the anchor to also be used to anchor relatively soft panels. Then, the head of the anchor bolt rests on the washer which, in turn, rests on the add-on part, that is to say, the head comes into indirect contact with the add-on part. The washer surrounds the anchor bolt annularly, preferably in the form of a closed ring, and it has an opening through which the anchor bolt passes. Advantageously, it is a part that is separate from the anchor bolt.

During the disassembly procedure, the torque and/or the tensile force is/are preferably applied to the anchor bolt behind the washer, that is to say, to the side of the washer facing away from the expansion element and/or from the expansion section since this section is very easily accessible. The engaging profile is preferably arranged between the collar and the washer, especially in the axial direction, thus ensuring that the engaging profile is very easily accessible.

Advantageously, the predetermined breaking point for a torsional break of the anchor bolt, in other words, the place where the anchor bolt breaks into the two anchor bolt fragments during the disassembly of the anchor and/or the place of the minimum overall cross section of the anchor bolt are arranged relatively far towards the front of the anchor bolt and are thus situated in a deep location once the anchor bolt has been installed. The front anchor bolt fragment can be correspondingly short. In particular, it can be provided that, following the disassembly procedure, a large portion of the hole is available so that an anchor can once again be easily installed. Accordingly, it is particularly preferred for the predetermined breaking point for a torsional break of the anchor bolt and/or for the minimum overall cross section of the anchor bolt to be in the front half, especially in the front one-third, of the anchor bolt.

It is particularly advantageous for the anchor bolt to have a neck section to accommodate the expansion element, especially the expansion sleeve, whereby the anchor bolt has its minimum overall cross section especially in the neck section. In particular, the neck section can advantageously have a dual function: on the one hand, it can accommodate the expansion element before the expansion procedure and, on the other hand, it can very easily define the predetermined breaking point for a torsional break of the anchor bolt, whereby the torsional break can be assisted by stress concentration sites. Since the neck section adjoins the expansion section, it is very easy to design the predetermined breaking point so that it is located towards the front of the anchor bolt, which translates into the above-mentioned advantages. If the expansion element is an expansion sleeve, the neck section can advantageously form an annular constriction of the bolt.

Advantageously, a method according to the invention uses an anchor according to the invention. Features that have been elaborated upon in conjunction with the method according to the invention can also be used in conjunction with the anchor according to the invention, and conversely, features that have been elaborated upon in conjunction with the anchor according to the invention can also be used in conjunction with the method according to the invention. The add-on part can especially be a fire-protection panel that is anchored by means of the anchor, for example, on the tubbing of a tunnel. It might be necessary to remove such fire-protection panels for inspection, repair or maintenance purposes. The method according to the invention can be employed for such a purpose.

BRIEF DESCRIPTION OF THE DRAWINGS

The invention will be described in greater detail below on the basis of preferred embodiments which are schematically shown in the accompanying figures, whereby individual features of the embodiments shown below can be fundamentally implemented either individually or in any desired combination within the scope of the invention. The figures schematically show the following.

DETAILED DESCRIPTION

Figure 1:
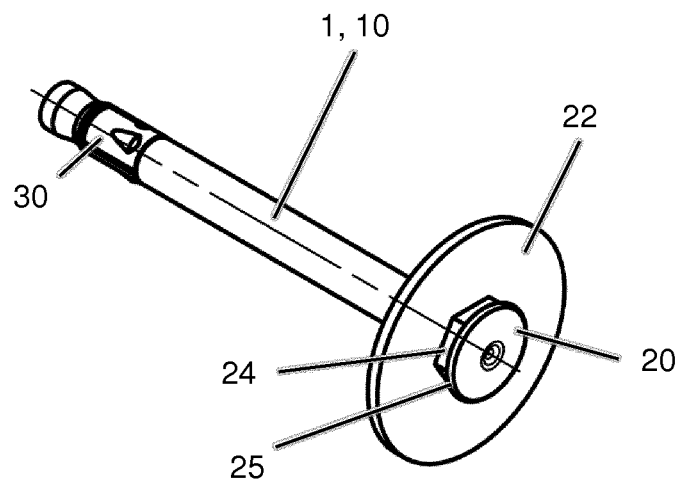
FIG. 1: a perspective view of an embodiment of an anchor according to the invention.
Figure 2:
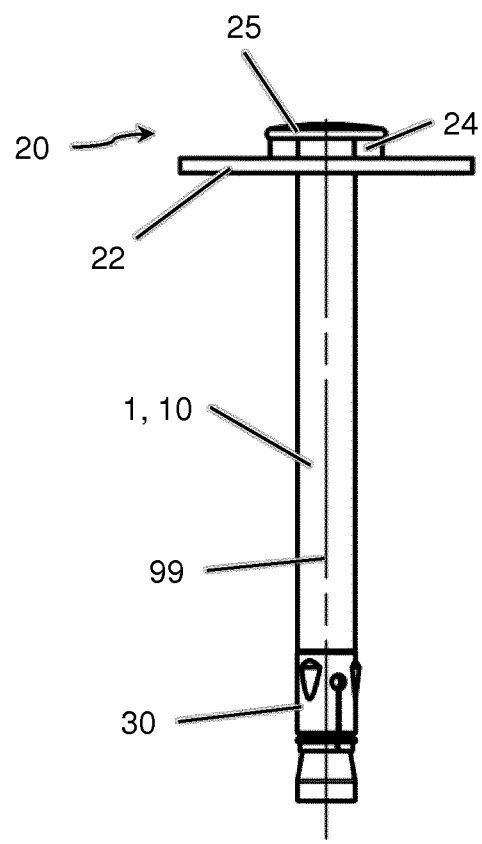
FIG. 2: a side view of the anchor shown in FIG. 1.
Figure 3:
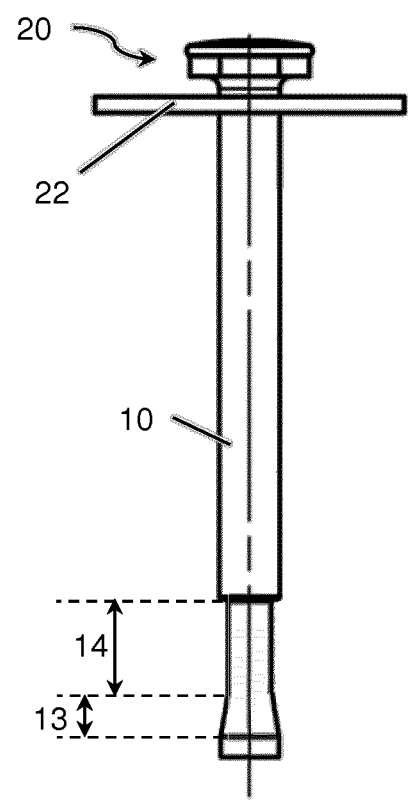
FIG. 3: a side view of the sleeve of the bolt of the anchor shown in FIGS. 1 and 2.

FIGS. 1 to 3 show a first embodiment of an anchor 1 according to the invention. The anchor 1 is configured as an expansion anchor and it has an elongated anchor bolt 10 and an expansion element 30 configured as an expansion sleeve which annularly surrounds the anchor bolt 10. In a front end section along the longitudinal axis 99 of the anchor bolt 10, the anchor bolt 10 has a neck section 14 and, adjoining it at the front, an expansion section 13. The anchor bolt 10 has its minimum overall cross section in the neck section 14, that is to say, this is where the cross section is at its smallest. The expansion element 30 configured as an expansion sleeve is accommodated in this neck section 14. In the expansion section 13, the cross section of the anchor bolt 10 once again increases towards the front, that is to say, the anchor bolt 10 tapers towards the rear in the expansion section 13. When the anchor 1 is being anchored, the expansion element 30 strikes the expansion section 13 of the anchor bolt 10, a process in which it is radially expanded.

The anchor bolt 10 also has a head 20 that is arranged at the end of the anchor bolt 10 along the longitudinal axis 99. The anchor bolt 10 has its maximum overall cross section at the head 20, that is to say, this is where its cross section is at its largest. The front of the head 20 of the anchor bolt 10 has a section with an engaging profile 24, whereby the engaging profile 24 is configured here as an external polygonal profile by way of an example. The engaging profile 24 serves to apply a torque from a disassembly tool 60 to the anchor bolt 10. The head 20 has an annular collar 25 at the rear of the engaging profile 24. This collar 25 projects in the radial direction beyond the engaging profile 24. Consequently, an axial step is formed between the engaging profile 24 and the collar 25, whereby the disassembly tool 60 can engage with this step so that a tensile force that is directed inwards can be applied to the anchor bolt 10.

In the presented embodiment, the anchor 1 also has a washer 22 that surrounds the anchor bolt 10 in the form of a ring. The opening in the washer 22 through which the anchor bolt 10 passes has a smaller cross section than the head 20, so that an axial force can be introduced indirectly via the washer 22 from the head 20 into an add-on part 9 that is to be fastened. The washer 22 is preferably a separate part from the anchor bolt 10. The washer 22, however, is optional and it is also conceivable for the head 20 to come into direct contact with the add-on part 9.

FIGS. 4 to 9 show consecutive stages during the installation and subsequent execution of a method according to the invention employing an anchor 1 as shown in FIGS. 1 to 3.

Figure 4:
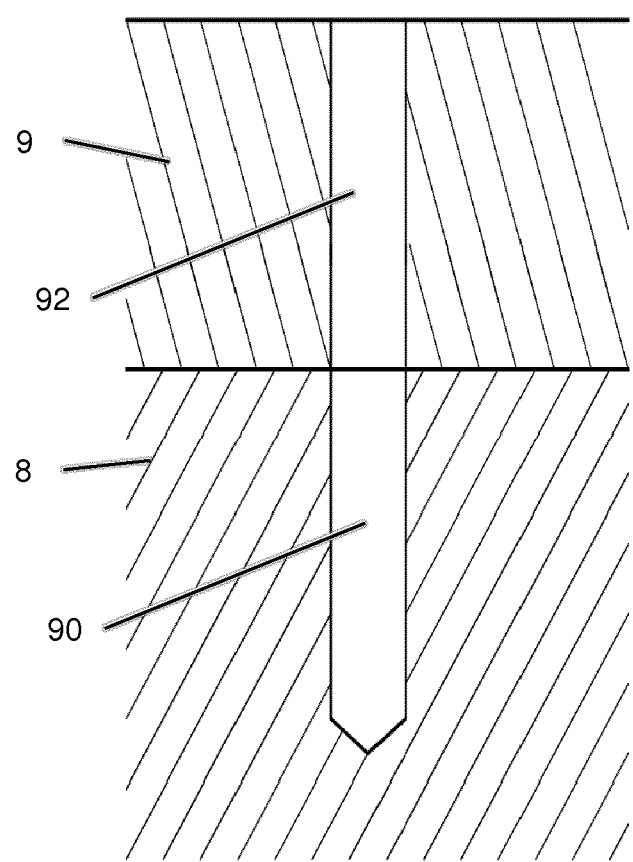
FIGS. 4 to 6: consecutive stages during the installation of the anchor bolt shown in FIGS. 1 to 3.

To start with, as shown in FIG. 4, a substrate 8 having an approximately cylindrical hole 90 as well as an add-on part 9 are provided, whereby the add-on part 9 has an approximately cylindrical opening 92 that is flush with the hole 90 in the substrate 8.

Figure 5:
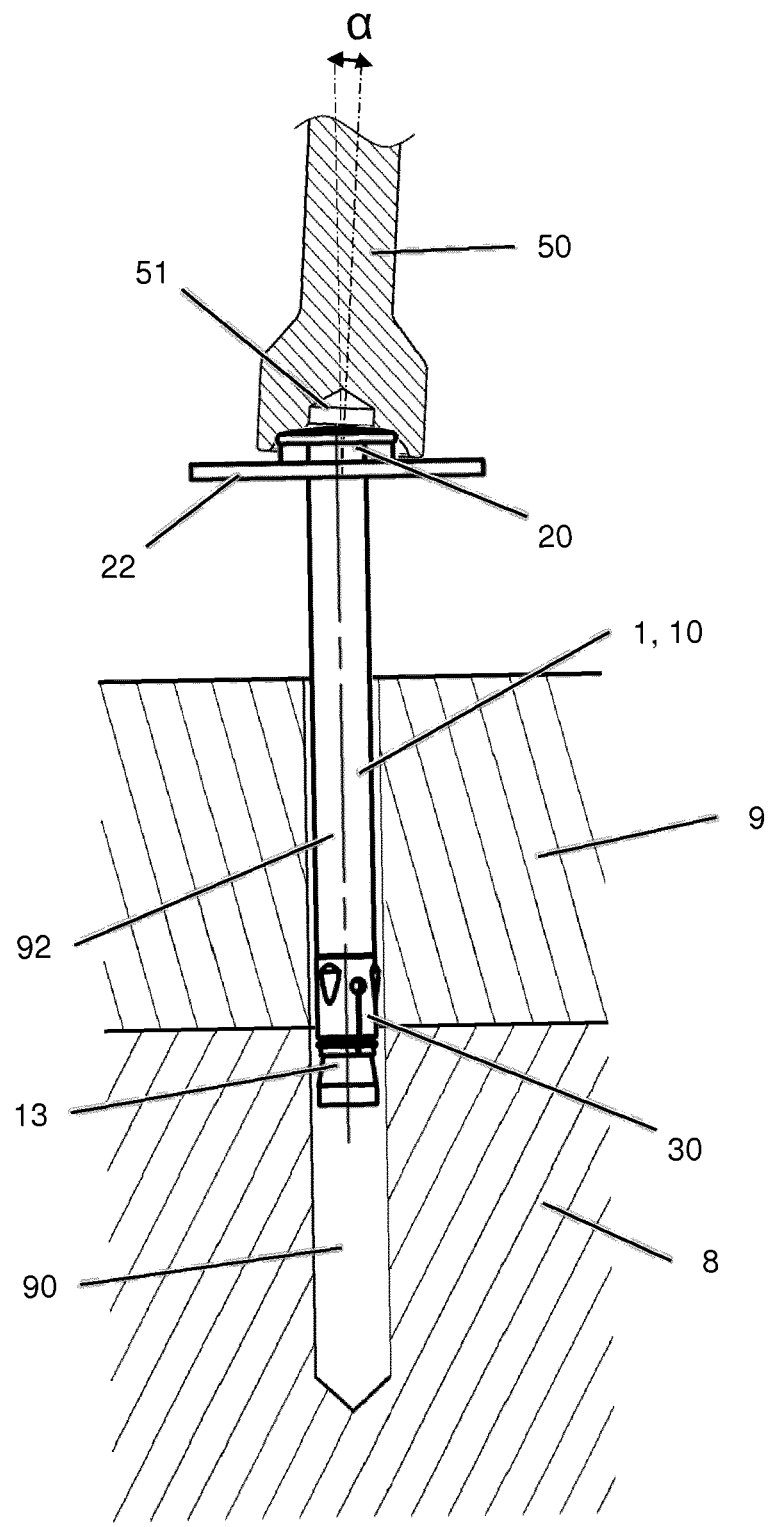
Figure 10:
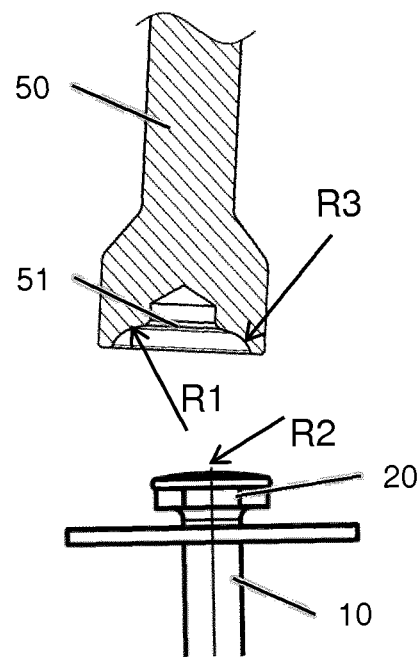
FIG. 10: an enlarged view of the installation tool shown in FIG. 5 and of the head of the anchor.

Then, as shown in FIG. 5, the anchor bolt 10 with its expansion section 13 in front is inserted into the opening 92 in the add-on part 9, and the anchor bolt 10 is driven into the hole 90 through the application of forces that are directed axially towards the front, that is to say, forces that are directed parallel to longitudinal axis 99. Preferably, the forces directed axially towards the front are applied to the head 20, for instance, by striking it with a hammer. Especially preferably, the installation tool 50 shown in FIG. 5 and in detail in FIG. 10 is used to apply the forces that are directed axially towards the front onto the head 20. As can especially be seen in FIG. 10, the front of the installation tool 50 has a socket 51 for the head 20 of the anchor bolt 10. In particular, it can be provided for the head 20 on the rear of the anchor bolt 10 to have an anchor radius R2 that is greater than a radius R1 of the installation tool 50 in the socket 51, whereby the radius R1 can advantageously taper to a much smaller radius R3. This configuration makes it possible to compensate for angle errors a during the installation of the anchor 1 as well as to accelerate the installation process, as is indicated in FIG. 5.

Figure 6:
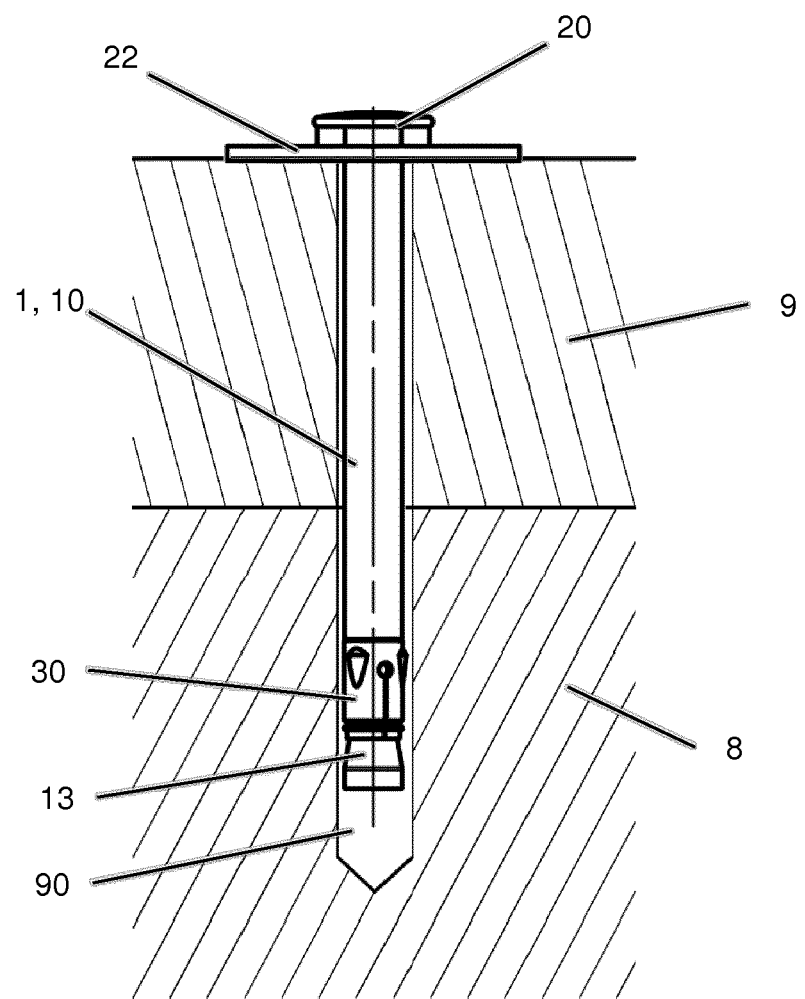

The anchor 1 is driven deeper and deeper into the hole 90 until its head 20 comes into contact with the add-on part 9, either directly or, as shown, via the optionally present washer 22. The resulting state is shown in FIG. 6. The anchor 1 and the add-on part 9 that it holds are now anchored on the substrate 8 by means of the expansion mechanism of the anchor 1 consisting of the expansion section 13 and of the expansion element 30.

Figure 7:
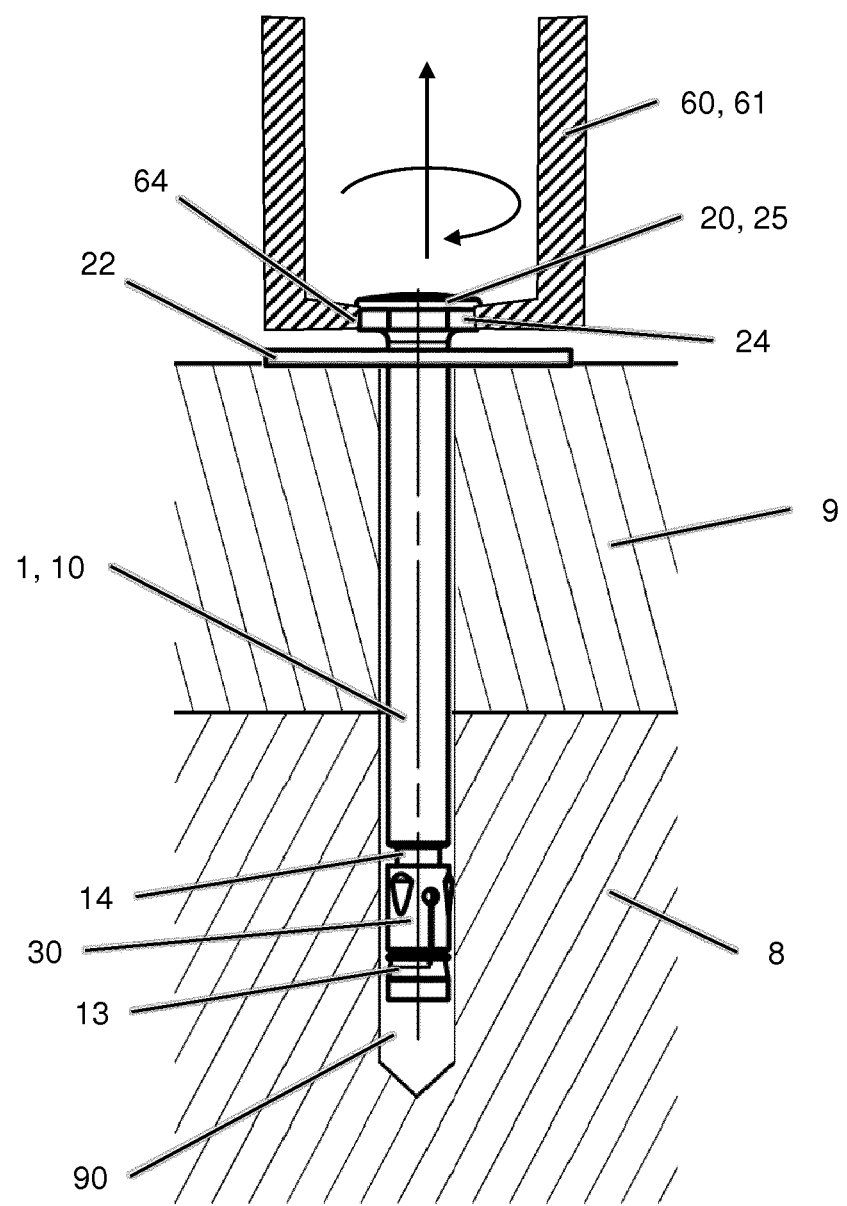
FIGS. 7 to 9: consecutive stages of the disassembly of the installed anchor bolt shown in FIGS. 1 to 3 within the scope of a method according to the invention.
Figure 8:
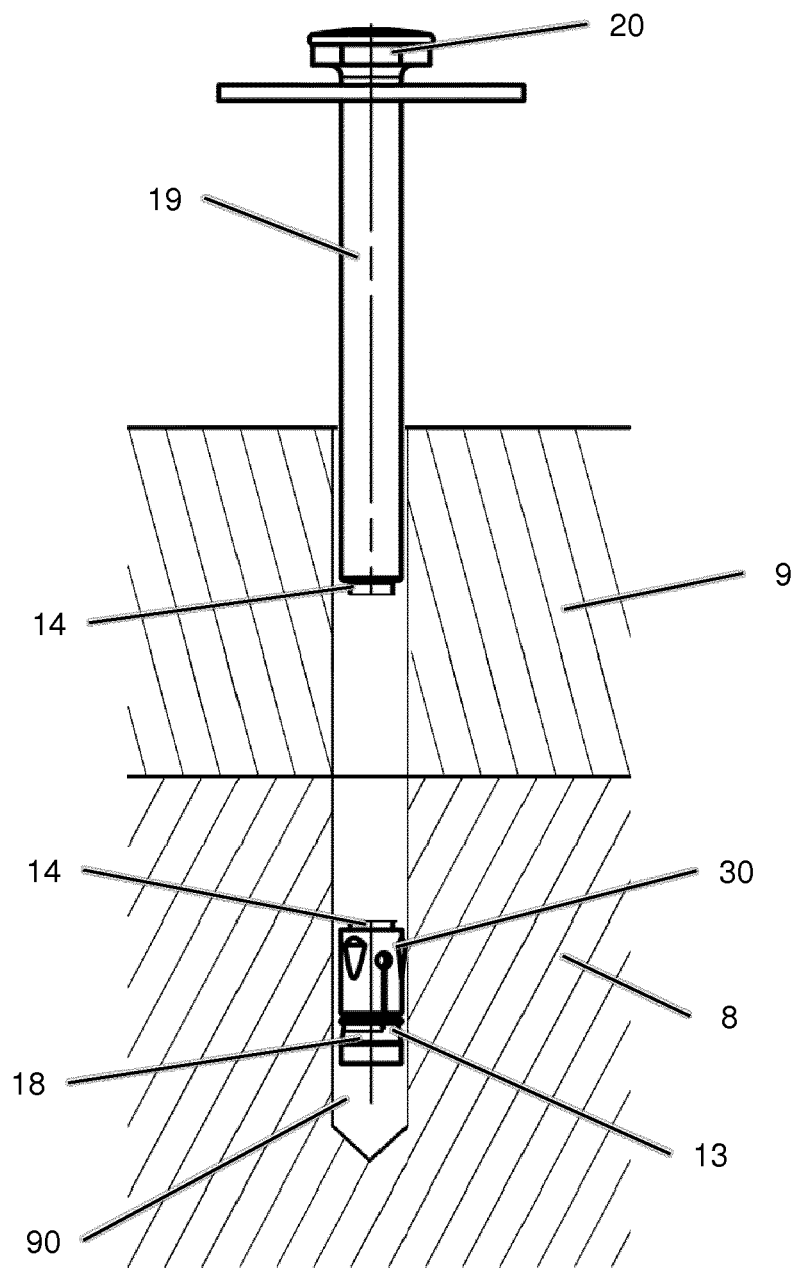
Figure 9:
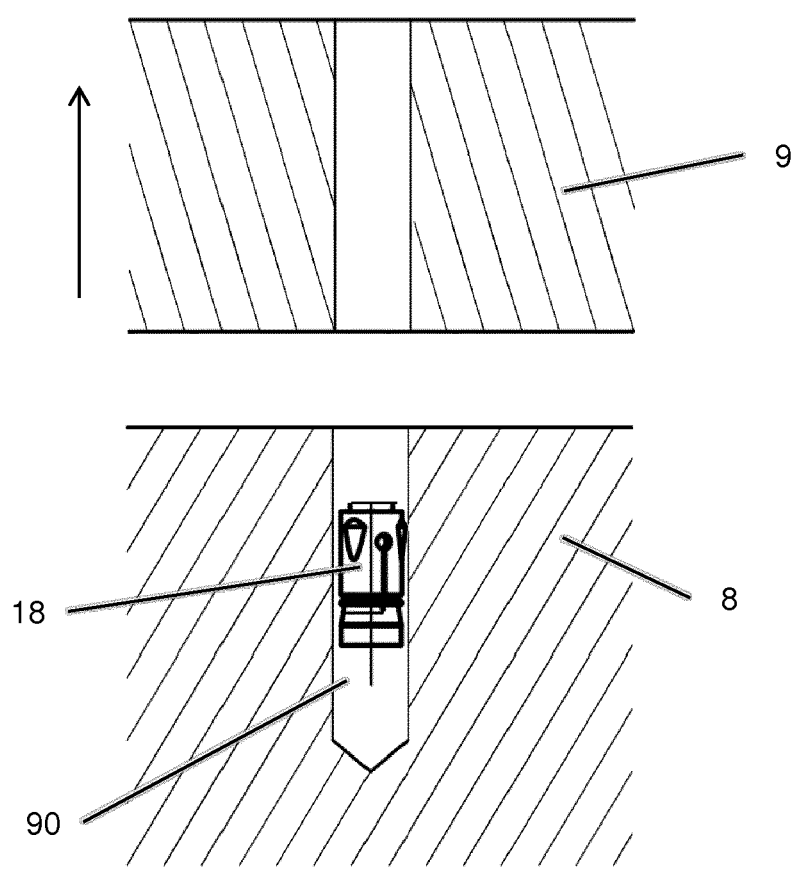

For instance, in order to replace a damaged add-on part 9 or to inspect the substrate 8 located under the add-on part 9, or else for other reasons, it might become necessary to release the anchoring. FIGS. 7 to 9 show consecutive stages during the execution of the disassembly method according to the invention that is suitable for this purpose.

As indicated by arrows in FIG. 7, a torque and preferably, at the same time, also a tensile force are applied to the anchor bolt 10 via its head 20. In this process, the torque is introduced via the engaging profile 24 situated on the head 20, while the tensile force is introduced at the collar 25 of the head 20. The tensile force causes the expansion section 13 to be pulled deeply into the expansion element 30, which prevents the anchor bolt 10 from turning in the expansion element 30 and/or it prevents the expansion element 30 from turning in the hole 90, thus ensuring that the front end section of the anchor bolt 10 is firmly and non-rotatably secured in the substrate 8. The torque that is applied to the head 20 and thus to the rear end of the anchor bolt 10 twists the anchor bolt 10 whose front is firmly and non-rotatably affixed in the substrate 8 to such an extent that the anchor bolt 10 breaks in a controlled manner into a front anchor bolt fragment 18, which retains at least part of the expansion section 13, and a rear anchor bolt fragment 19, which retains the head 20, in other words, the anchor bolt 10 is destroyed during the disassembly procedure. The resulting state is shown in FIG. 8. Now, once any other anchors that might still be present have been released, the add-on part 9 can be lifted off from the substrate 8 as indicated by an arrow in FIG. 9 and subsequently removed. In this process, the front anchor bolt fragment 18 is left behind in the substrate 8.

Advantageously, a predetermined breaking point for breaking the anchor bolt 10 in the method according to the invention is arranged in such a way that the front anchor bolt fragment 18 that is left behind in the substrate 8 is short enough not to protrude from the substrate 8, that is to say, the anchor bolt fragment 18 is completely sunk into the hole 90 in the substrate 8. This allows, among other things, the previously disassembled add-on part or another add-on part to be installed once again very easily, whereby in certain circumstances, the hole 90 already present in the substrate 8 can be used once again. As can be seen by comparing FIGS. 7 and 8, the predetermined breaking point for breaking the anchor bolt 10 in the method according to the invention is preferably located in the neck section 14, where the anchor bolt 10 advantageously has its smallest cross section, that is to say, in the disassembly method according to the invention, the anchor bolt 10 preferably breaks in the neck section 14. Such a predetermined breaking point can be implemented with very little design effort since the dimensioning of the neck section 14 already requires a relatively small cross section in the neck section 14 in order to accommodate the expansion element 30.

Figure 11:
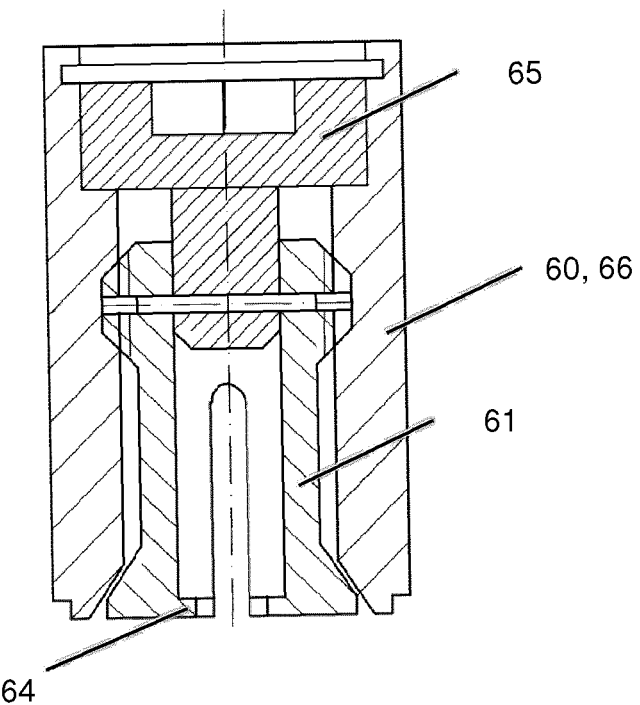
FIG. 11: a detailed view of the disassembly tool that is only roughly shown schematically in FIG. 7.

For purposes of applying the torque and preferably also the tensile force to the head 20, it is especially possible to employ a disassembly tool 60 that is roughly shown schematically in FIG. 7 and in detail in FIG. 11. In the presented embodiment, the disassembly tool 60 has claws 61, each of which has a profile 64 that matches, especially at the end, the engaging profile 24 on the head 20. As shown in FIG. 7, the profile 64 of the claws 61 is brought into contact with the engaging profile 24, and the configuration of the profiles 64 so as to match the engaging profile 24 allows a positive-fit transmission of the torque from the disassembly tool 60 to the head 20. In this process, the profiles 64 of the claws 61 engage in front of the collar 25, so that the profiles 64 rest axially on the collar 25 and the tensile force can be transmitted from the disassembly tool 60 to the head 20. In other words, the disassembly tool 60 engages with the bottom of the head 20 and then breaks the anchor bolt 10.

As is especially shown in FIG. 11, the disassembly tool 60 preferably has a coupling 65 which, on the one hand, is coupled to a rotating machine, for instance, a tangential impact driver and which, on the other hand, is coupled non-rotatably but axially moveably, to the claws 61. Moreover, the disassembly tool 60 has a sleeve 66 in which the claws 61 are mounted so as to be axially moveable. Lead-in ramps are formed between the sleeve 66 and the claws 61, and these ramps force the claws 61 together radially so that they can engage with the anchor bolt 10, especially with the head 20, when the claws 61 are inserted into the sleeve 66.

In order to reduce the tensile force on the add-on part 9 within the scope of the disassembly method, which can be particularly advantageous for purposes of reducing the pressure onto the add-on part 9 if the add-on part is to be re-used, the expansion section 13 can be configured so as to have a non-circular cross section, for instance, an elliptical or polygonal shape. This configuration prevents the anchor bolt 10 from turning in the expansion element 30, even at relatively low tensile forces. For purposes of producing such an anchor bolt 10, first the neck section 14 can be drawn in a scaled size and subsequently pressed in place.

What is claimed is:

1. An anchor comprising:
    an anchor bolt having a head in a rear section of the anchor bolt; and
    at least one expansion element arranged on the anchor bolt;
    the anchor bolt having, in a front section, an expansion section for the expansion element, the anchor bolt tapering towards a rear in the expansion section, the expansion element being configured to strike the expansion section of the anchor bolt to radially expand the expansion element to anchor the anchor;
    the anchor bolt having an engaging profile so that a torque can be applied to the anchor bolt; wherein the engaging profile is arranged on the head and the head has a collar projecting beyond the engaging profile and adjoining a rear of the engaging profile.

2. The anchor as recited in claim 1 further comprising a washer surrounding the anchor bolt.

3. The anchor as recited in claim 2 wherein the head has a collar projecting beyond the engaging profile and adjoining a rear of the engaging profile, the engaging profile being arranged between the collar and the washer.

4. The anchor as recited in claim 1 wherein the expansion section is permanently arranged on the anchor bolt.

5. The anchor as recited in claim 4 wherein the expansion section is permanently joined to the head of the anchor bolt.

6. The anchor as recited in claim 1 wherein the engaging profile is in the form of an external polygonal profile.

7. The anchor as recited in claim 1 wherein the anchor bolt has a neck section to accommodate the expansion element, the anchor bolt having a minimum overall cross section in the neck section.

8. The anchor as recited in claim 1 wherein the anchor bolt including the head and the expansion section is configured monolithically without joints.

9. The anchor as recited in claim 1 wherein the head is permanently arranged on the anchor bolt.

10. A disassembly method for an anchor anchored in a hole, the anchor including an anchor bolt, the disassembly method comprising:
    applying a torque to the anchor bolt of the anchor anchored in the hole to stress the anchor bolt until the anchor bolt breaks; and
    wherein the anchor bolt breaks to release anchoring of an add-on part to a substrate, the anchoring having been effectuated by the anchor.

11. The method as recited in claim 10 wherein the anchor breaks inside the hole.

12. The method as recited in claim 10 wherein the anchor is an expansion anchor.

13. The method as recited in claim 10 wherein the anchor bolt has a head and the torque is applied to the head of the anchor bolt.

14. The method as recited in claim 10 wherein the torque is applied to the anchor bolt via a disassembly tool.

15. The method as recited in claim 10 wherein the anchor bolt tapers towards a rear in the expansion section, the expansion element being configured to strike the expansion section of the anchor bolt to radial expand the expansion element to anchor the anchor.

16. A disassembly method for an anchor anchored in a hole, the anchor including an anchor bolt, the disassembly method comprising:
    applying a torque to the anchor bolt of the anchor anchored in the hole to stress the anchor bolt until the anchor bolt breaks; and
    applying a tensile force to the bolt at the same time as the torque so that the anchor bolt is stressed until the anchor bolt breaks.

17. The method as recited in claim 16 wherein anchor bolt breaks to release anchoring of an add-on part to a substrate, the anchoring having been effectuated by the anchor.

18. The method as recited in claim 16 wherein the anchor breaks inside the hole.

19. The method as recited in claim 16 wherein the anchor is an expansion anchor.

20. The method as recited in claim 16 wherein the anchor bolt has a head and the torque is applied to the head of the anchor bolt.

21. The method as recited in claim 16 wherein the torque is applied to the anchor bolt via a disassembly tool.

22. The method as recited in claim 16 wherein the anchor bolt has a head in a rear section of the anchor bolt; and the anchor further includes at least one expansion element arranged on the anchor bolt; the anchor bolt having, in a front section, an expansion section for the expansion element; the anchor bolt having an engaging profile so that the torque can be applied to the anchor bolt.

23. The method as recited in claim 16 wherein the anchor bolt tapers towards a rear in the expansion section, the expansion element being configured to strike the expansion section of the anchor bolt to radial expand the expansion element to anchor the anchor.

\* \* \* \* \*